May 5, 1953  R. D. BOUTROS ET AL  2,637,538
MIXING APPARATUS

Filed Sept. 29, 1950  6 Sheets-Sheet 1

INVENTORS
RICHARD D. BOUTROS,
JAMES V. DONOHOE
AND MILTON DYKMAN
BY Edward H. Cumpston
THEIR ATTORNEY

INVENTORS
RICHARD D. BOUTROS,
JAMES V. DONOHOE,
AND MILTON DYKMAN
BY Edward H. Cumpston
THEIR ATTORNEY Patented May 5, 1953

2,637,538

UNITED STATES PATENT OFFICE 2,637,538

MIXING APPARATUS

Richard D. Boutros, James V. Donohoe, and Milton Dykman, Brighton, N. Y., assignors to Mixing Equipment Co., Inc., Rochester, N. Y., a corporation of New York Application September 29, 1950, Serial No. 187,444

17 Claims. (Cl. 259—144)

This invention relates to agitating apparatus, and more particularly, to the type adapted to enter through the top of a fluid-containing receptacle, one object of the invention being to provide an improved agitating apparatus of this variety having a more simple and efficient type of construction and producing an improved and more efficient agitating action.

In the batch mixing of paint and the like it is common to use a series of open top fluid-containing receptacles which from time to time require the addition of mechanical agitating means to accelerate the intermixing and blending of the materials, and another object of this invention is to provide an improved agitating apparatus which is adapted to be quickly and readily moved from an operating position in one receptacle to a similar position in a second receptacle.

Another object of the invention is to provide an agitating apparatus in which the agitator can be quickly and easily lowered into operating position for agitating the contents of the receptacle and which, when it is desired to remove the agitating apparatus, may be quickly raised above the top of the receptacle out of operating position.

Another object of the invention is to provide an agitating apparatus having the above advantages which is provided with baffles for improving the agitating action and greatly decreasing the time required for mixing.

Another object is to provide an agitating apparatus of the above character in which the baffles are automatically raised and lowered with the raising and lowering of the agitator.

Another object is to provide an efficient agitating apparatus having the above advantages in which the agitator and baffles are easily removed from operating position in one receptacle so that they and the receptacle also, if desired, can be readily cleaned and the agitator and baffles prepared for use with a different material in a second receptacle.

Still a further object is to provide an agitating apparatus having the above advantages in a more practical and efficient type of construction capable of being readily manufactured and assembled and of operating in an improved and more efficient manner.

To these and other ends the invention resides in certain improvements and combinations of parts, all as will be hereinafter more fully described, the novel features being pointed out in the claims at the end of the specification.

Figure 1:
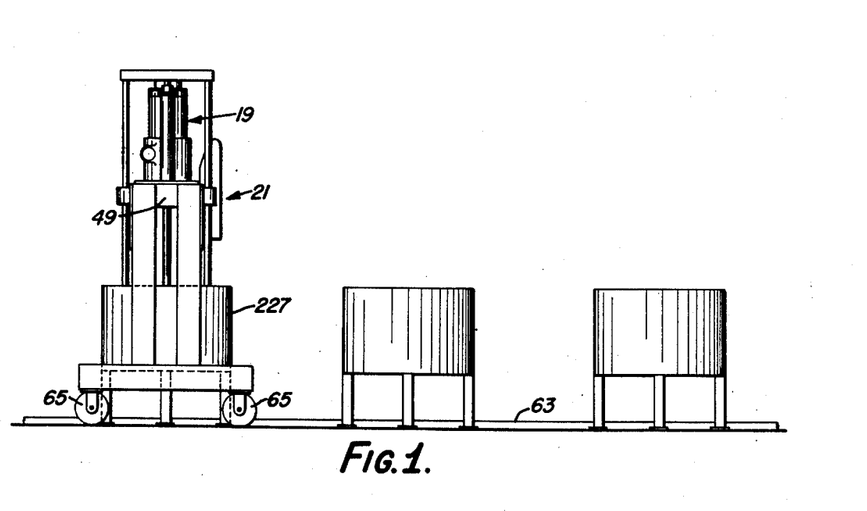
Fig. 1 is an end elevation showing an agitating apparatus embodying the present invention in position astride a fluid-containing receptacle.
Figure 2:
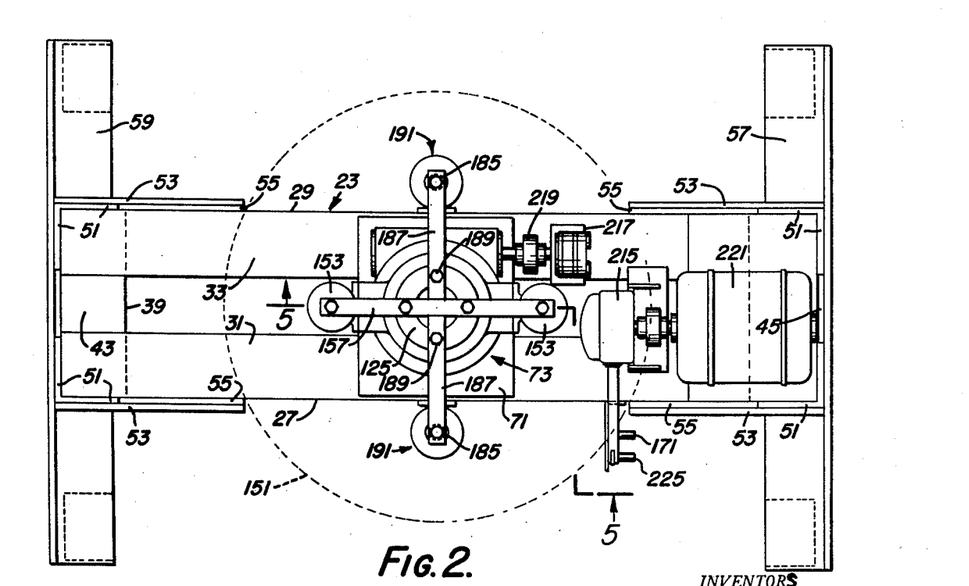
Fig. 2 is a plan view in a larger scale of the above agitating apparatus.
Figure 3:
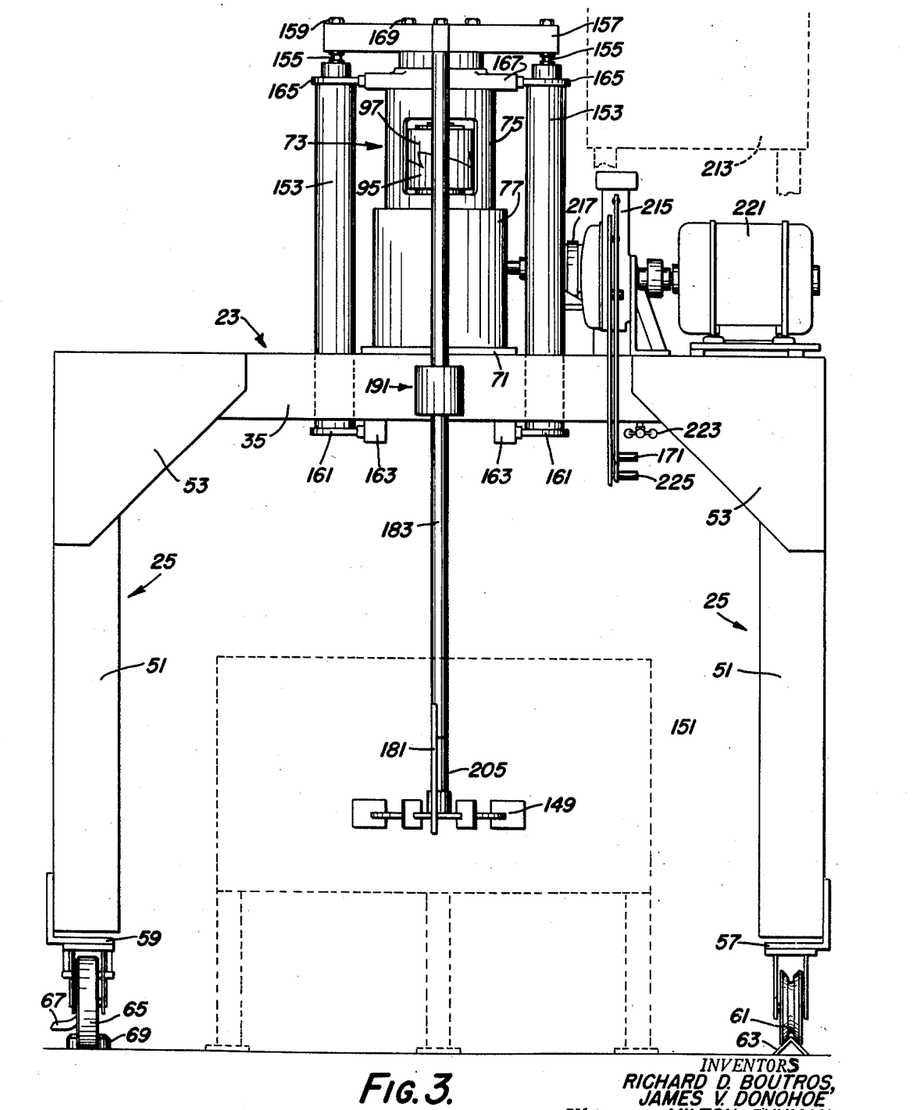
Fig. 3 is a side elevation showing the agitator and baffles in the lowered or operating position.

The preferred form of the invention, herein disclosed, by way of illustration, comprises an agitating apparatus shown generally at 19 (Fig. 1) mounted on a frame shown generally at 21 (Fig. 1) which comprises a substantially horizontal platform shown generally at 23 (Figs. 2 and 3) having at the opposite ends thereof vertically extending legs shown generally at 25 (Fig. 3).

As shown in Fig. 2, platform 23 comprises two elongated side members 27 and 29 having horizontally extending surfaces 31 and 33, respectively, and vertically extending surfaces 35 (Fig. 3) and 37 (Fig. 5), respectively, and two end members 39 (Fig. 2) and 41 (Fig. 6) having horizontally extending surfaces 43 and 45 (Fig. 2), respectively, and vertically extending surfaces, not shown, and 49 (Figs. 1 and 6), respectively. Said side members 27 and 29 and end members 39 and 41 comprise metal angle irons, preferably of steel, having a suitable thickness and strength as well understood in the art, which are welded together to form a rectangular platform 23 as shown in Fig. 2.

Figure 4:
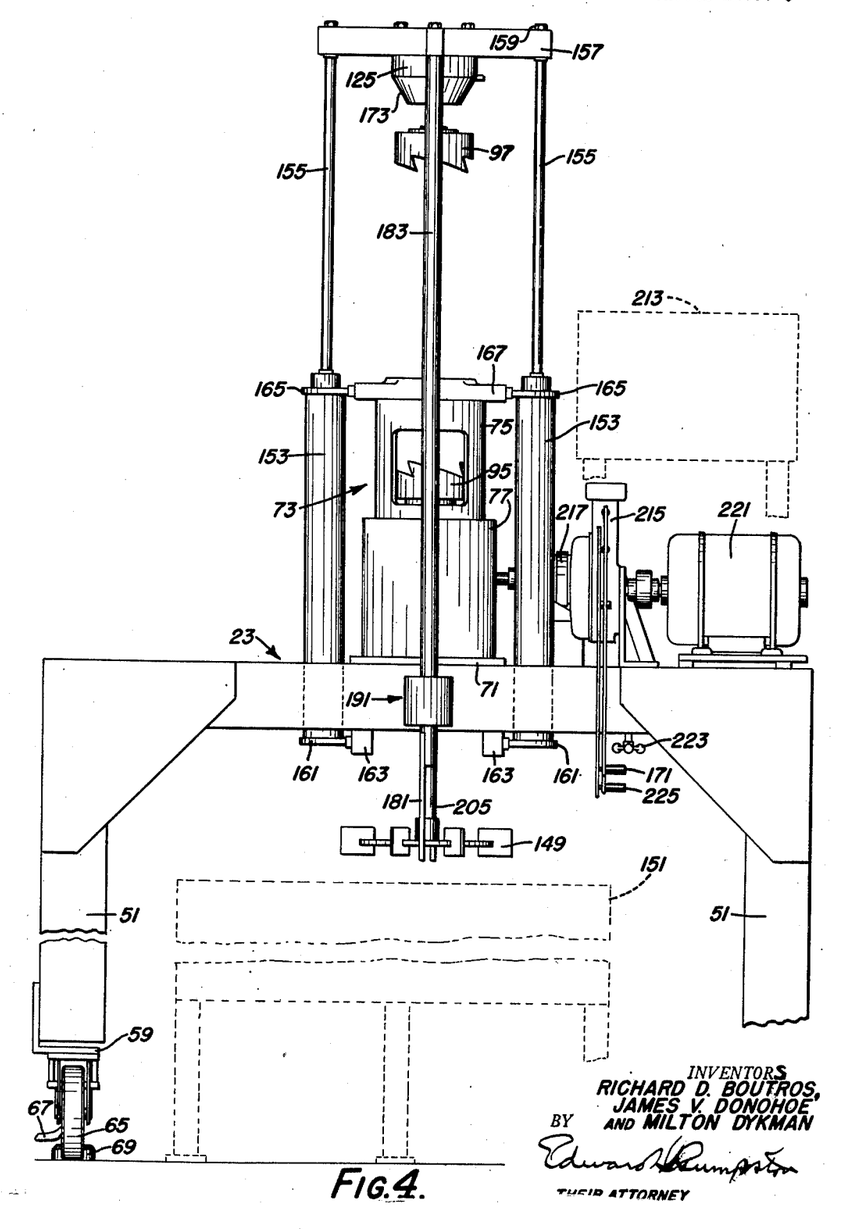
Fig. 4 is similar to Fig. 3 but shows the agitator and baffles in the raised or non-operating position.
Figure 6:
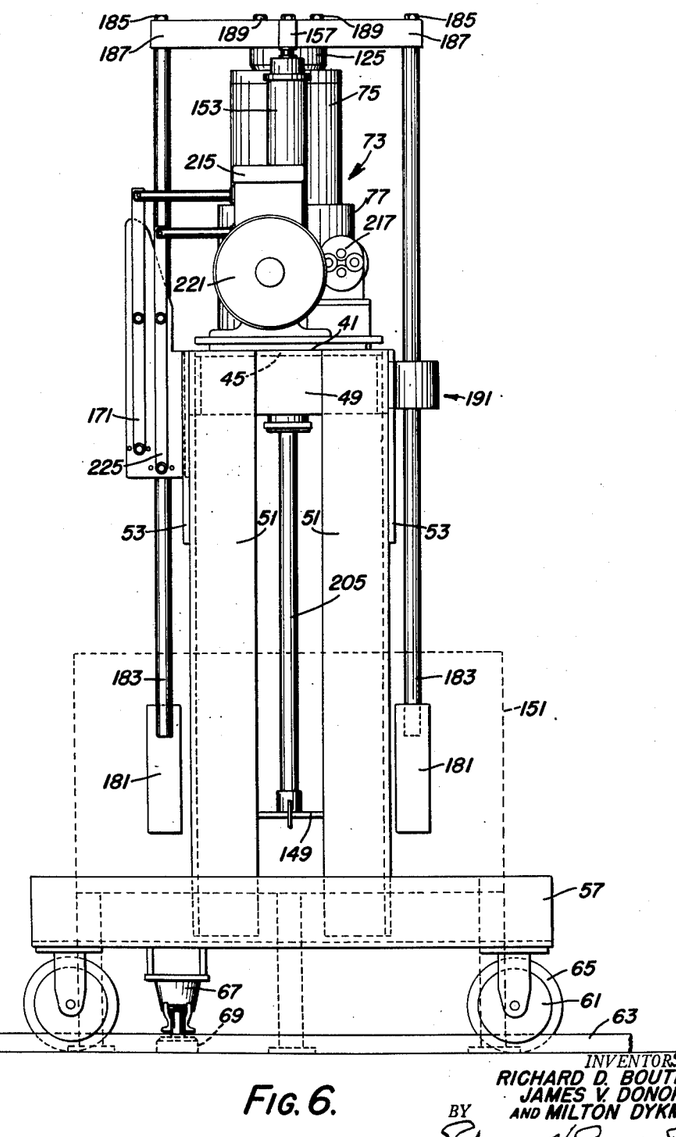
Fig. 6 is an end elevation showing the agitator and baffles in the lowered or operating position.

Legs 25 comprise two vertically extending angle irons 51 (Figs. 2, 3 and 6) similar to the above side and end members, which are fastened in depending position to the corners of platform 23, preferably by welding, as shown in Figs. 2 and 6. Reinforcing gussets 53 are fastened to vertically extending surfaces 35 and 37 of platform side members 27 and 29, respectively, and the corresponding leg members 51, as shown in Figs. 2, 3 and 4. Spacer blocks 55 (Fig. 2) having a thickness equal to the thickness of leg members 51 are inserted between vertical surfaces 35 and 37 and reinforcing gussets 53 as shown in Fig. 2. Right and left hand leg members 51 as viewed in Figs. 2 and 3 are welded at the lower ends thereof to leg base supports 57 and 59, respectively, which are short sections of angle iron, similar to that described above, extending parallel to the platform end members 41 and 39 as shown in Fig. 2.

Leg base supports 57 and 59 have fastened to the opposite ends thereof suitable caster or roller means by which the frame may be easily moved from a position astride a fluid-containing receptacle to a similar position astride a second fluid-containing receptacle. Although these roller means may be varied to suit particular installations, we prefer to use on one leg base grooved rollers 61 (Fig. 3) which are adapted to engage a fixed track 63. Rollers 61, as shown in Fig. 3, are mounted on the right hand leg base 57. The left hand leg base 59 has attached in similar positions two rollers 65 (Fig. 3) of suitable diameter adapted to directly contact the floor. A suitable foot operated locking device 67 (Fig. 6) of known construction, having a plunger 69 for frictionally engaging the floor, is secured to the left leg base 59 for locking said frame in the desired position. It is to be understood that although the above frame has been shown to be movable it may in certain instances be preferable to fix the frame in one location and move the fluid-containing receptacle into position beneath platform 23.

Figure 5:
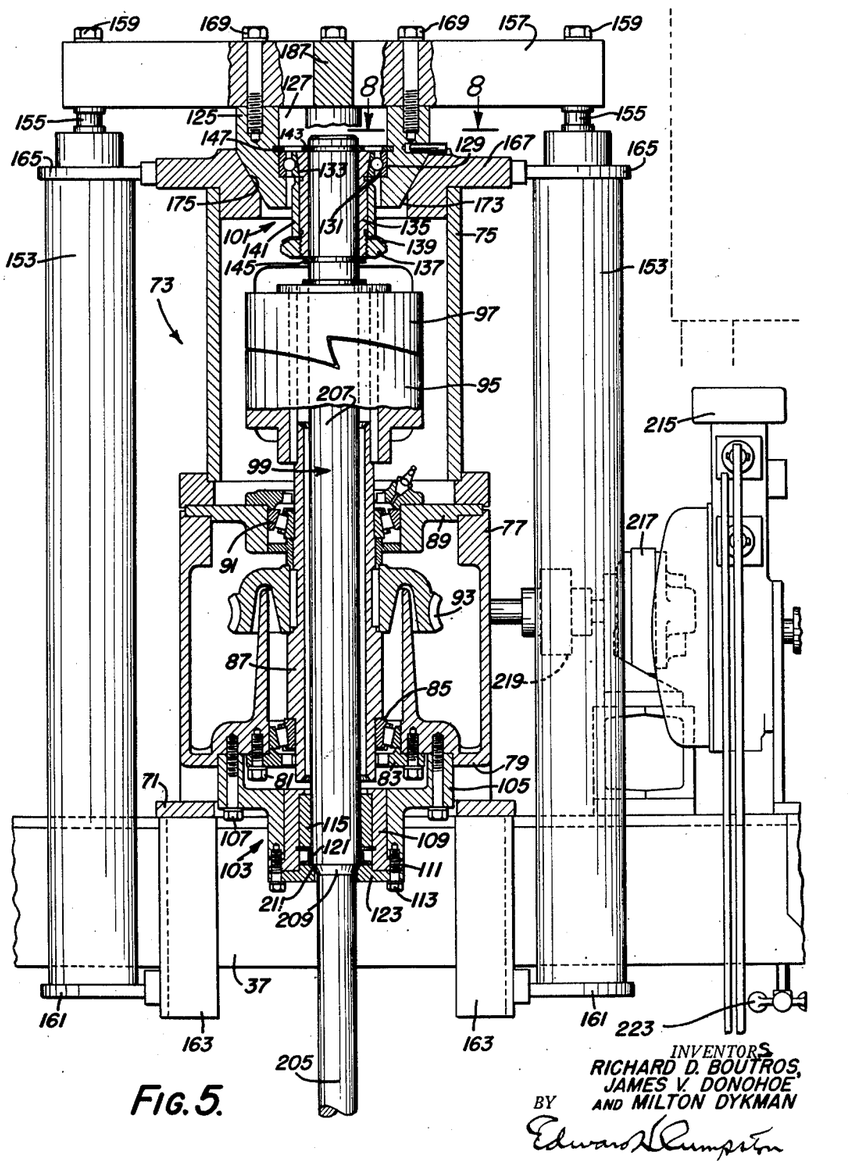
Fig. 5 is an enlarged, fragmentary, sectional elevation substantially along line 5—5 of Fig. 2.

A rectangular plate 71 (Fig. 2) which forms the base of an agitator rotating means or actuating apparatus shown generally at 73 (Fig. 3), is secured to platform 23, adjacent the center thereof, by suitable means (not shown). Said apparatus comprises a two-piece cylindrical frame having upper and lower sections 75 and 77, respectively, as shown in Figs. 4 and 5. As shown in Fig. 5, lower section 77 has adjacent the lower end thereof a transversely extending flange 79 which has a large bore formed therein. Flange 79 has secured thereto by bolts 81, a ring 83 which releasably supports a tapered roller bearing 85 adapted to engage and support the lower end of a longitudinally extending hollow quill 87. Frame section 77 has attached adjacent the upper end thereof a transversely extending plate 89 which positions a second tapered roller bearing 91 for engaging and supporting the upper end of said quill. Quill 87 has a worm gear 93, driven by means to be hereinafter described, secured adjacent the midportion thereof by suitable means (not shown). Reference is made to the patent to Hesse, No. 2,489,642, for a complete disclosure of the construction of this driving gearing including the hollow quill, the worm gear and the quill supporting bearings.

Figure 7:
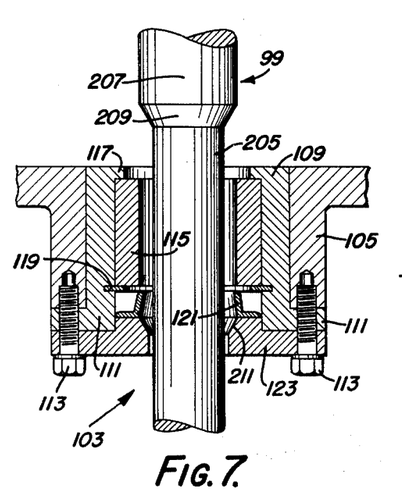
Fig. 7 is an enlarged fragmentary sectional elevation showing the lower shaft bearing construction.

Quill 87 has fastened to the upper end thereof a spiral jaw clutch member 95 (Fig. 5) which is adapted to engage a similar spiral jaw clutch member 97 secured to the agitator driving shaft shown generally at 99 in Figs. 5 and 7. Agitator driving shaft 99 extends vertically through the hollow quill 87 and is independently supported above and below said quill by upper and lower shaft bearings shown generally at 101 and 103 (Fig. 5), respectively. The only connection between quill 87 and drive shaft 99 is through the engagement of spiral jaw clutch members 95 and 97. As a result, shaft 99 is free to move vertically upward through said quill from a position shown in Fig. 3 to the position shown in Fig. 4. At the same time, the quill and the means for driving the quill, to be hereafter described, are free from direct contact with the shaft and are not only protected against any vibration or shocks to which the shaft may be subjected in use, but also are unaffected by lateral deflection of the shaft between its upper and lower bearings.

The lower or fixed bearing structure, as shown in Figs. 5 and 7, comprises a housing 105 which is secured by bolts 107 (Fig. 5) to flange 79 at the lower end of frame section 77. A removable hollow retaining housing 109, having an outwardly projecting flange 111 at the lower end thereof, is inserted through the lower open end of housing 105 and is secured to the above housing 105 by bolts 113. Housing 109 has an internal diameter substantially greater than the diameter of the shaft and is adapted to releasably position a sleeve bearing 115 which guides and supports the lower end of the agitator driving shaft. Sleeve bearing 115 is prevented from moving upwardly through housing 109 by an inwardly projecting flange 117 (Fig. 7) on the upper end of said housing. A snap ring 119 (Fig. 7) prevents sleeve bearing 115 from moving downwardly and holds said bearing 115 in position against said inwardly projecting flange. An oil seal 121 is held in place below sleeve bearing 115 by a retaining and scraper cap or plate 123, to be hereinafter more fully described, which is fastened to the lower end of housing 105 by the above bolts 13.

The upper bearing 101 as shown in Fig. 5, is adapted to move vertically, by means to be hereafter described, and to carry with it the agitator drive shaft 99 which is rotatably supported therein. Said bearing comprises a movable bearing housing 125 which has a hollow chamber 127 formed therein. Slidably fitted in chamber 127 is a ball bearing 129 of any known or suitable construction, having a tapered internal opening 131 engaging the correspondingly tapered outer surface portion 133 of a sleeve 135 fitted to the drive shaft 99. Sleeve 135 is of resilient metal split longitudinally and so capable of being contracted and releasably clamped to the shaft. For this purpose, one end of the sleeve has threadedly engaged therewith a thrust means or lock nut 137 carrying a washer 139 bearing against one end of a ring 141 slidable longitudinally in a cylindrical portion of the outer surface of sleeve 135. The opposite end of sleeve 141 bears against roller bearing 129 for moving the same longitudinally to oppose the tapered surfaces 131 and 133 of the bearing and sleeve and so contract and clamp the split sleeve 135 on the shaft. Sleeve 135 is prevented from moving upwardly or downwardly along shaft 99 by snap rings 143 and 145, respectively. Bearing 129 is prevented from moving upwardly through chamber 127 by snap ring 147.

Figure 12:
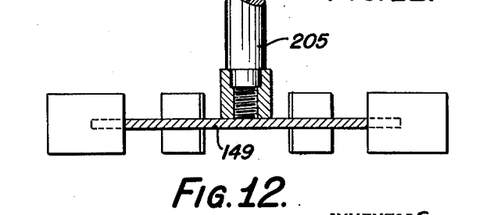
Fig. 12 is a sectional elevation of the agitator showing the agitator fastened to the lower end of the drive shaft.

Drive shaft 99 extends downwardly through platform 23 and has attached at the lower end thereof an agitator 149 shown in Figs. 3, 4 and 12 which is adapted to be positioned within a fluid-containing receptacle 151 shown by broken lines in Figs. 3 and 4 for agitating the contents thereof. To move frame 21 and the above agitator from operating position within one receptacle to a similar position in respect to a second receptacle, it is necessary to raise the agitator 149 and drive shaft 99 to clear the upper edge of the receptacle. Our invention also comprises a novel lift means, to be presently described, for raising and lowering the agitator and drive shaft.

As stated in the above description of the upper shaft bearing 101, shaft 99 is free to rotate relative to bearing housing 125, but at the same time, said shaft is prevented from moving vertically relative to said housing. To raise and lower bearing housing 125 and shaft 99, we provide a hydraulic means, as shown in Figs. 3, 4 and 5, comprising a pair of vertically extending cylinders 153 having cooperating pistons and piston rods 155 which extend upwardly through said cylinders and are connected at the upper ends thereof to a crosshead 157 by bolts 159. Cylinders 153 are supported at the lower ends thereof by a pair of brackets 161 which in turn are fastened to plate 71 by a pair of depending supporting arms 163. Cylinders 153 are supported at the upper ends thereof by a similar pair of brackets 165, secured to a circular supporting block 167 which in turn forms the top of, and is fastened to, upper cylinder frame section 75. Crosshead 157 is fastened to movable bearing housing 125 by bolts 169. Cylinders 153 are provided at the upper and lower ends thereof with suitable nipple means (not shown), for connection to a source of fluid pressure as well understood in the art. By applying the fluid pressure to the lower or blank ends of said cylinders, piston rods 155 may be moved upwardly from their positions as shown in Fig. 3 to their positions as shown in Fig. 4, which movement also raises movable bearing housing 125, agitator drive shaft 99 and spiral jaw clutch member 97 which is secured to said drive shaft. Similarly, piston rods 155, drive shaft 99, clutch member 97 and bearing housing 125 may be lowered to their positions as shown in Figs. 3 and 5 by applying fluid pressure to the rod ends of said cylinders as well understood in the art. The application of fluid pressure to the rod or blank ends of said cylinders is controlled by a suitable valve of known construction (not shown), which is operated by lever 171 (Figs. 3, 4 and 7).

In order to assure proper alignment and concentricity of the movable bearing housing and agitator drive shaft when said housing and shaft are in the lowered or downward positions thereof, we provide said bearing housing at the outer lower portion thereof with a tapered portion 173 (Figs. 4 and 5) which is adapted to engage a correspondingly tapered bore 175 (Fig. 5) formed in bearing support 167.

Figure 8:
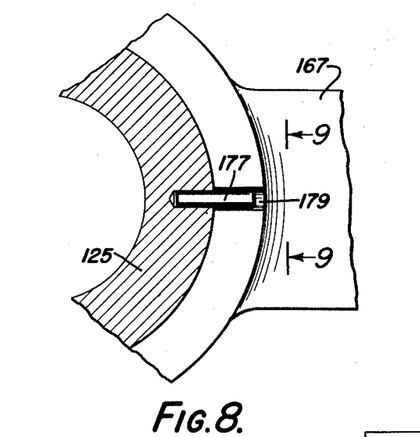
Fig. 8 is an enlarged, fragmentary, sectional plan view substantially along line 8—8 of Fig. 5.
Figure 9:
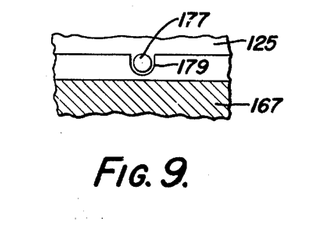
Fig. 9 is a fragmentary sectional elevation substantially along line 9—9 of Fig. 8.

Should the upper bearing 129 seize, it would subject movable bearing housing 125 and crosshead 157 to a twisting movement, which movement might seriously damage the above hydraulic lift mechanism. To forestall possible damage of this sort, we provide movable bearing housing 125 with an outwardly projecting pin 177 (Fig. 8) which, when the bearing housing is in the lowered position, is adapted to fit into a notched recess 179 formed in housing support 167 as shown in Figs. 8 and 9, thereby preventing accidental rotation of movable bearing housing 125 and crosshead 157.

It is well known in the art that the provision of baffles in a fluid-containing receptacle increases the efficiency of an agitator operating therein, thereby greatly reducing the time required and power consumed in achieving the desired intermixing. However, in many instances, receptacles are not provided with baffles because of the expense involved in making such an installation. In addition, the baffles are difficult to clean, thereby adding to the maintenance cost and, moreover, the presence of baffles may render the receptacle unsuitable for certain types of work which, in effect, decreases its flexibility and adaptability. Our invention also comprises a novel baffle system, having none of the above disadvantages, which is not fastened to the fluid-containing receptacle, but rather is mounted on frame 21 and is adapted to be lowered and raised along with agitator 149 into and out of a fluid-containing receptacle.

The baffle system comprises a pair of rectangularly shaped baffle plates 181 (Fig. 6) fastened by suitable means (not shown) to the lower ends of vertically extending baffle rods 183, as shown in Fig. 6. Baffle rods 183 are secured at the upper ends thereof by bolts 185 to cross arms 187 which are co-planar with, extend transversely to, and intersect crosshead 157 at the center thereof as shown in Figs. 2 and 6. Cross arms 187 are welded to crosshead 157 and are secured to movable bearing housing 125 by bolts 189 as shown in Figs. 2 and 6. As a result, baffle plates 181 and rods 183 will be raised and lowered simultaneously with the corresponding vertical movement of agitator 149. To insure proper alignment of baffle plates 181, frame 21 is provided with means for guiding the vertical movement of baffle rods 183.

Figure 10:
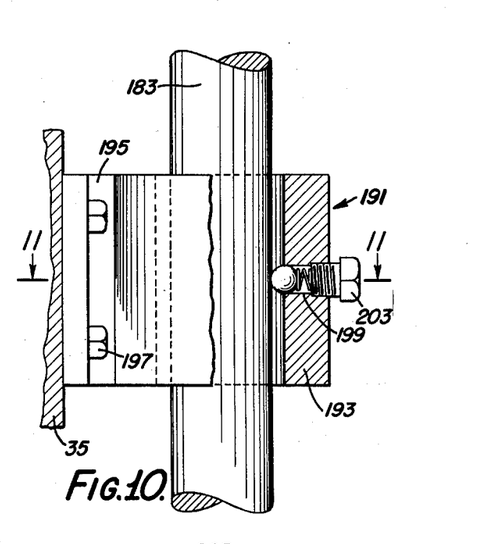
Fig. 10 is an enlarged, fragmentary elevation, partly in section and partly broken away, showing the baffle rod guides.
Figure 11:
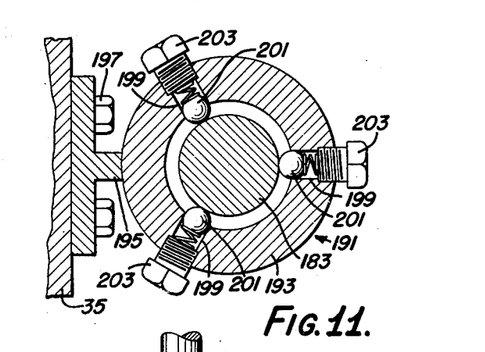
Fig. 11 is a sectional plan view substantially along line 11—11 of Fig. 10.

Said baffle guide means shown generally at 191 (Figs. 2, 3, 4, 6 and 11) comprise short sleeve sections 193 (Fig. 11) secured to mounting brackets 195 (Fig. 11) by suitable means (not shown) which in turn are secured at opposite sides of platform 23 to vertically extending surfaces 35 and 37 by bolts 197 (Fig. 11) as shown in Fig. 2. In order to prevent material which would clog the baffle guides from being carried up into sleeve sections 193 as the agitator and baffles are raised, the internal diameter of said sleeve sections 193 is larger than the outside diameter of baffle rods 183 as shown in Fig. 11. To insure concentricity between sleeve sections 193 and baffle rods 183, and prevent lateral movement therebetween, sleeve 193 is provided with three radially extending holes 199 (Figs. 10 and 11) into which are fitted three spring loaded guide balls 201 as shown in Fig. 11. Although guide balls 201 are under sufficient pressure to hold baffle rods 183 in position, they will move sufficiently to ride over any material that might be carried upwardly on the baffle rods. The spring tension on guide balls 201 can be varied by adjusting retaining screws 203 (Fig. 11) which are threaded into the outer portions of holes 199.

In order to prevent paint or other materials from being drawn up into the lower shaft bearing as the agitator shaft is raised, the drive shaft 99 is undercut forming a lower portion 205 (Fig. 5) which is smaller in diameter than the upper portion 207 as shown in Figs. 5 and 7. With the drive shaft in the lowered or operating position, upper portion 207 extends downwardly to a point opposite the lower edge of dust seal 121 as shown in Fig. 5. At this point, shaft 99 is formed with a tapered portion 209

(Fig. 5) joining the larger and smaller diameter portions thereof. Scraper cap 123 has bored therein a correspondingly tapered seat 211 (Fig. 7) adapted to engage said tapered shaft portion 209 when the shaft is in the lowered position. The opening in cap 123 through which agitator shaft 99 passes is somewhat larger in diameter than the lower portion 205, but is not as large as the upper portion 207 of said shaft, as shown in Fig. 7, and, therefore, has a scraping action which removes any large pieces of material carried on the agitator shaft as it moves upwardly from its operating position. Any material remaining on lower shaft portion 205 will be in the form of a thin film or coating and as there is a considerable clearance between the inner diameter of lower shaft sleeve bearing 115 and lower shaft portion 205, as shown in Fig. 7, this material cannot possibly contact or interfere with said bearing.

The power means for driving hollow quill 87 and agitator 149 when in the lowered or operating position comprises preferably an electro-hydraulic system. The hydraulic system comprises a tank or reservoir 213, shown by broken lines in Figs. 3 and 4, for holding a supply of suitable actuating fluid as, for example, oil, a hydraulic pump 215 (Fig. 2), and a hydraulic motor 217 (Fig. 2) which is connected by a coupling 219 (Fig. 2) to a worm (not shown) which engages worm gear 93 secured to quill 87. Pump 215 which is driven by an electric motor 221 (Fig. 2) draws actuating fluid from reservoir or tank 213 and delivers this fluid at high pressure to hydraulic motor 217 for driving the same. The exhaust fluid is returned from hydraulic motor 217 to reservoir 213 by suitable conducting means (not shown). A speed regulating valve of known construction (not shown), operated by handle 223 (Figs. 3 and 5) controls the rate of fluid flow to the hydraulic motor and thereby controls the operating speed of said motor, and thus the operating speed of quill 87 and agitator 149. The hydraulic system is provided with a second or shut-off valve (not shown), actuated by lever 225 (Figs. 3 and 6), which opens and closes the hydraulic line between the above speed control valve and hydraulic motor 217.

Hydraulic pump 215 is also connected on the pressure side thereof to the hydraulic lift control valve (not shown) which regulates the application of fluid pressure to the rod or blank ends of hydraulic cylinders 153. A suitable pressure relief valve of known construction is inserted in the high pressure discharge line leading from hydraulic pump 215. This relief valve is set to vent the hydraulic line into reservoir 213 when the pressure in said line exceeds a given amount, thereby protecting both the hydraulic lift apparatus and the hydraulic driving mechanism from possible damage due to excessive fluid pressure in the hydraulic system.

In operation, therefore, the agitating apparatus, with the agitator 149 and baffles 181 in the raised positions as shown in Fig. 1, is moved into the desired position over a fluid-containing receptacle 151 (Fig. 1). The frame is releasably locked in the above position by depressing floor locking plunger 69. As soon as electric motor 221 is connected to a suitable source of electric power, agitator 149 and baffles 181 can be lowered from their raised or non-operative positions as shown in Figs. 1 and 4, to their lowered or operating positions as shown in Figs. 3 and 6 by moving lever 171 to the "lower" position thereby directing the high pressure fluid to the rod ends of hydraulic cylinders 153 and at the same time venting the fluid line leading from the blank ends of said cylinders into reservoir 213. This valve also opens an auxiliary fluid line connecting hydraulic pump 215 and hydraulic motor 217 and allows a small amount of high pressure fluid to pass into said hydraulic motor causing the motor to turn over at a low speed. This movement is transmitted through coupling 219 to the above worm which drives worm gear 93 secured to quill 87. This rotates the lower, spiral-jaw, clutch member 95 at a very low speed and insures positive engagement between clutch member 95, secured to quill 87, and clutch member 97, secured to drive shaft 99, as said drive shaft and clutch member 97 are moved into the lowered or operating positions thereof.

The tapered portion 173 on movable bearing housing 125, which, when in the lowered position thereof, engages tapered bore 175 in support 167 insuring proper alignment and concentricity between driving shaft 99 and quill 87 and between clutch members 95 and 97. When drive shaft 99 has reached its lowered position as shown in Figs. 3 and 5, control lever 171 is returned to its center position.

To start the agitator, control lever 225 is moved to the "run" position which opens the high pressure fluid line between hydraulic pump 215, the above speed regulating valve and hydraulic motor 217 causing said motor to rotate. As pointed out above, this rotary motion is transmitted to clutch member 95 which is now in driving engagement with clutch member 97, secured to agitator drive shaft 99. The speed of the agitator can be easily varied by adjusting the speed regulating valve which increases or decreases the rate of fluid flow to the hydraulic motor. A small amount of exhaust fluid from hydraulic motor 217 is bled into the rod ends of hydraulic cylinders 153 insuring the proper seating of movable bearing housing 125 on support 167 and the proper engagement of clutch members 95 and 97.

After the agitation is completed, the agitator and baffles are raised by moving lever 171 to the opposite or "raise" position, which, by means of the above regulating valve, directs the high pressure fluid to the blank ends of cylinder 153 and vents the fluid lines leading from the rod ends of the cylinders into reservoir 213. Thereafter, the apparatus can be easily rolled to a new position.

Although, under normal circumstances, the agitator drive mechanism would be turned off before the shaft is raised, it is evident that no harm would result from raising the agitator while it is being driven, for as drive shaft 99 moves upwardly, clutch member 97, fastened thereto, quickly moves out of engagement with clutch member 95, thereby disengaging the agitator drive shaft from the driving mechanism.

Thus it will be seen that the above invention supplies an agitating apparatus which is readily adapted for use with a plurality of open-top, fluid-containing receptacles, as commonly used in the batch mixing of paint and the like. The apparatus can be quickly and easily positioned over a fluid-containing receptacle, the agitator and baffles lowered into operating position and, after proper agitation, the agitator and baffles raised to their non-operating positions. The agitating apparatus can then be moved to a similar position over a second receptacle for further agitation, or the agitator and baffles can be easily cleaned by merely lowering them into a receptacle containing a cleaning fluid and running the agitator for a suitable length of time within said fluid. As a result, the above apparatus, at a greatly smaller cost, can quickly and efficiently perform the same work as would normally require several separate agitating devices.

The above hydraulic power means can be eliminated and electric motor 221 connected to coupling 219 either directly or through any known and suitable speed control mechanism, as for example, V-belts and cone pulleys. If this is done, the hydraulic lift mechanism can be operated by a suitable supply of air or water pressure, which is connected to the above elevating control valve. Except for the provision for slowly turning quill 87 and clutch member 95 as drive shaft 99 and clutch member 97 are lowered into their operating position, the above agitating device operates in the same manner as above. Where external power is used with cylinders as above, variable speed can be obtained by V-belts or other means of speed variation.

It will thus be seen that the invention accomplishes its objects and while it has been herein disclosed by reference to the details of preferred embodiments, it is to be understood that such disclosure is intended in an illustrative rather than a limiting sense, as it is contemplated that various modifications in the construction and arrangement of the parts will readily occur to those skilled in the art, within the spirit of the invention and the scope of the appended claims.

We claim:

1. An agitating apparatus comprising a frame having bearing means, a shaft slidable longitudinally in said bearing means and provided with an agitator, means for rotating said shaft and agitator, and means comprising an electric motor for sliding said shaft to lower and raise said agitator relative to said motor and rotating means into and out of a receptacle.

2. An agitating apparatus comprising a frame having spaced bearing means, a shaft rotatable and slidable longitudinally in said bearing means and provided with an agitator, electric motor means and an hydraulic means actuated by said electric motor means for rotating said shaft and agitator, and means for sliding said shaft to lower and raise said agitator relative to said motor means and hydraulic means into and out of a receptacle.

3. An agitating apparatus comprising an agitator, a shaft connected to said agitator for driving the same, a quill enclosing said shaft in spaced relation therewith, flexible driving means connecting said quill with said shaft, a fluid pressure system provided with means for driving said quill, and for lowering and raising said shaft and agitator into and out of a receptacle, and electric motor means for operating said fluid pressure system.

4. An agitating apparatus comprising an agitator, a shaft connected to said agitator for driving the same, a quill enclosing said shaft in spaced relation therewith, flexible driving means connecting said quill with said shaft, gearing for driving said quill, hydraulic means for driving said gearing, means for lowering and raising said agitator into and out of a receptacle, and motor means for actuating said hydraulic means.

5. An apparatus for agitating the contents of an open-top receptacle and comprising a frame provided with bearing means, a shaft rotatable and slidable in said bearing means and provided with an agitator, means for rotating said agitator, baffle means movably mounted on said frame, and power operated means on said frame for lowering and raising said agitator and said baffle means relative to said rotating means into and out of said receptacle.

6. An apparatus for agitating the contents of an open-top receptacle and comprising a frame provided with bearing means, a shaft rotatable and slidable in said bearing means and provided with an agitator, means for rotating said agitator, baffle means movably mounted on said frame, and a common power operated means for simultaneously lowering and raising said agitator and baffle means relative to said rotating means into and out of a receptacle.

7. An agitating apparatus comprising a frame movable to and from a position astride a fluid-containing receptacle, said frame having a substantially horizontal platform means, supporting leg means at opposite ends of said platform means, agitating means mounted on said platform means, means on said frame for driving said agitating means, means for lowering and raising said agitating means relative to said frame into and out of a receptacle, and clutch means for connecting said driving and agitating means operated automatically by the lowering and raising movements of said agitating means.

8. An agitating apparatus comprising a frame adapted to be positioned above a fluid-containing receptacle, agitating means mounted on said frame, baffle means mounted on said frame, means on said frame for driving said agitating means, means for lowering and raising said agitating means and baffle means relative to said driving means into and out of said receptacle, and means for automatically disengaging said driving means when said agitating means and baffle means are raised, said disengaging means comprising a pair of cooperating clutch members adapted to move in and out of engagement with one another as said agitating means and baffle means are lowered and raised.

9. An agitating apparatus comprising a frame adapted to be positioned above a fluid-containing receptacle, agitating means mounted on said frame, baffle means mounted on said frame, means for driving said agitating means, means for lowering and raising said agitating means and baffle means into and out of said receptacle, and cooperating centering means on said frame and said agitating means for centering said agitating means and baffle means in the lowered positions thereof and for limiting the downward movement of said agitating means and baffle means.

10. An agitating apparatus comprising a frame adapted to be positioned above a fluid-containing receptacle, agitating means mounted on said frame, baffle means mounted on said frame, means on said frame for driving said agitating means, means for lowering and raising said agitating means and baffle means into and out of said receptacle, and centering means on said frame and agitating means for centering said agitating means and baffle means in the lowered position thereof and for limiting the downward movement of said agitating means and baffle means, said centering means comprising a pair of cooperating members, one of said members having a tapered bore formed therein, the other of said members having a projecting tapered portion adapted to engage said tapered bore as said agitating means and baffle means are moved to lowered positions.

11. An agitating apparatus comprising an agitator, a frame adapted to be positioned above a fluid-containing receptacle, agitating means mounted on said frame, means on said frame for driving said agitating means, means for lowering and raising said agitating means into and out of said receptacle, and centering means on said frame and agitating means for centering said agitating means in the lowered position thereof and for limiting the downward movement of said agitating means, said centering means comprising a support on said frame having a tapered bore formed therein, a movable bearing housing on said lowering and raising means rotatably supporting one end of said agitating means and having a tapered portion adapted to engage the tapered bore of said support as said agitating means is lowered into the downward or operating position thereof.

12. An agitating apparatus comprising a frame adapted to be positioned above a fluid-containing receptacle, agitating means mounted on said frame, baffle means mounted on said frame, means for driving said agitating means, means for lowering and raising said agitating means and baffle means into and out of said receptacle, cooperating centering means on said frame and agitating means for centering said agitating means in the downward or lowered position thereof and for limiting the downward movement of said agitating means and baffle means, and means for automatically disengaging said agitator driving means as said agitator means and baffle means are raised.

13. An agitating apparatus comprising a frame adapted to be positioned above a fluid-containing receptacle, agitating means mounted on said frame, baffle means mounted on said frame, means on said frame for driving said agitating means, means for lowering and raising said agitating means and baffle means into and out of said receptacle, cooperating centering means on said frame and agitating means for centering said agitating means in the lowered position thereof and for limiting the downward movement of said agitating means and said baffle means, and means for automatically disengaging said agitator driving means as said agitator means and baffle means are raised.

14. An agitating apparatus comprising a shaft, an agitator on said shaft, means for lowering and raising said shaft and agitator into and out of a receptacle, means for rotating said shaft, and spaced upper and lower bearing means rotatably supporting said shaft, said upper bearing means being movable with said shaft, the lower portion of said shaft having a smaller diameter than the upper portion thereof, for movement through, but out of contact with, said lower bearing means for preventing transfer by said shaft of the contents of the receptacle to said lower bearing means as said shaft and agitator are raised.

15. An agitating apparatus comprising a shaft, an agitator on said shaft, means for lowering and raising said shaft and agitator into and out of a receptacle, means for rotating said shaft, spaced upper and lower bearing means rotatably supporting said shaft, said upper bearing means being movable with said shaft, the lower portion of said shaft having a smaller diameter than the upper portion thereof, for movement through but out of contact with, said lower bearing means for preventing transfer by said shaft of the contents of the receptacle to said lower bearing means as said shaft and agitator are raised, and scraper means located below said lower bearing means and closely engaging the lower portion of said shaft for partially removing the contents of the receptacle from said shaft as said shaft and agitator are raised.

16. An agitating apparatus comprising a frame adapted to be positioned above a fluid containing receptacle, a shaft mounted on said frame, an agitator on said shaft, baffle means, means for lowering and raising said shaft and baffle means into and out of a receptacle, means for rotating said shaft, bearing means on said frame for supporting said shaft, the lower portion of said shaft having a smaller diameter than the upper portion thereof for movement through, but out of contact with, said bearing means for preventing transfer by said shaft of the contents of the receptacle to said bearing means as said shaft is raised, and guide means on said frame for supporting said baffle means, said guide means having guiding balls in supporting engagement with said baffle means for preventing transfer by said baffle means of the contents of the receptacle to said guide means as said baffle means is raised.

17. An agitating apparatus comprising a frame movable to and from a position above a fluid-containing receptacle, a crosshead movably mounted on said frame, agitating means rotatably supported by said crosshead, baffle means mounted on said crosshead, hydraulic means for moving said crosshead for lowering and raising said agitating means and baffle means into and out of a receptacle, cooperating centering means on said frame and said crosshead for centering said agitating means in the lowered position thereof and for limiting the downward movement of said agitating means and said baffle means, means for driving said agitating means, and means for automatically disengaging said driving means as said crosshead is raised.

RICHARD D. BOUTROS.
JAMES V. DONOHOE.
MILTON DYKMAN.

References Cited in the file of this patent

UNITED STATES PATENTS

| Number | Name | Date |
|---|---|---|
| 1,228,823 | Robertson | June 5, 1917 |
| 1,291,728 | Beach | Jan. 21, 1919 |
| 1,354,230 | Walther et al. | Sept. 28, 1920 |
| 1,401,475 | Jensen | Dec. 27, 1921 |
| 1,431,715 | Wolters | Oct. 10, 1922 |
| 1,485,205 | Sturtevant | Feb. 26, 1924 |
| 1,838,004 | Scarlett | Dec. 22, 1931 |
| 1,843,315 | Blish et al. | Feb. 2, 1932 |
| 2,115,956 | Jorgensen | May 3, 1938 |
| 2,389,498 | Gates | Nov. 20, 1945 |
| 2,481,731 | Dubin | Sept. 23, 1949 |